United States Patent
Sukonik et al.

(10) Patent No.: US 6,553,487 B1
(45) Date of Patent: Apr. 22, 2003

(54) DEVICE AND METHOD FOR PERFORMING HIGH-SPEED LOW OVERHEAD CONTEXT SWITCH

(75) Inventors: Vitaly Sukonik, Katsir (IL); Alexander Miretsky, Haifa (IL); Amit Dor, Ramat Gan (IL)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/479,200

(22) Filed: Jan. 7, 2000

(51) Int. Cl.[7] .......................... G06F 9/44; G06F 13/16; G06F 9/50
(52) U.S. Cl. ................. 712/228; 712/229; 709/108; 709/106; 711/150
(58) Field of Search ................. 712/228, 229, 712/213, 248; 704/246; 710/264, 261, 112; 709/108, 106, 107, 104; 711/148, 220, 150

(56) References Cited

U.S. PATENT DOCUMENTS

| | | | |
|---|---|---|---|
| 5,036,539 A | * | 7/1991 | Wrench, Jr. ................. 704/246 |
| 5,655,132 A | * | 8/1997 | Watson ....................... 709/132 |
| 5,815,701 A | | 9/1998 | Slavenburg ................. 709/108 |
| 5,966,529 A | | 10/1999 | Sollars ........................ 712/228 |

OTHER PUBLICATIONS

TriCore Architecture Manual, Preliminary Edition, Siemens, pp. 6 to 8.

* cited by examiner

Primary Examiner—Daniel H. Pan

(57) ABSTRACT

A device and method for performing high speed low overhead context switch, and especially in processors that handle multilevel nested tasks. The device handles forward requests and backward requests. The device is coupled to a central processing unit and has plurality of register files and a direct memory access mechanism that allows a processor to respond to a forward request by starting to handle a higher priority task using a first register file while transferring the halted task context from the second register file to a context save area within a memory module. The processor responds to a backward request by using the context that is stored in a first register file, while transferring to the second register file a lower priority task context.

18 Claims, 3 Drawing Sheets

DEVICE AND METHOD FOR PERFORMING HIGH-SPEED LOW OVERHEAD CONTEXT SWITCH

FIELD OF THE INVENTION

A device and a method for performing high-speed low overhead context switch, and especially a device and a method for performing high-speed low overhead context switch in a processor that allows multilevel nested interrupts and exceptions.

BACKGROUND OF THE INVENTION

Most processors have a central processing unit (i.e.—CPU) that is coupled to a register file. The central processing unit is also commonly referred to as an arithmetic logic unit ALU. A processor handles tasks, whereas a task is an independent thread of control. Associated with any task is a task context. A task context is the information that a processor needs needs in order to define the state of the associated task and enable its continued execution. Usually, a task context includes the content of the general purpose registers that the task uses, the task's program counter and program status information. A task context is stored in a register file accessed by the CPU.

A processor handles a task until the task ends or until the processor is requested to handle a higher priority task. The task is halted and the processor performs a context switch that enables the processor to handle the higher priority task. Usually, interrupts and exceptions are given relatively high priority.

In some prior art solution, during a task switch the task context was transferred to an internal or an external memory module. The task context is retrieved from the internal or external memory module after the processor finishes to handle the higher priority task.

A relative high overhead is associated with some of the prior art methods for performing a context switch. Such a prior art solution is implemented in the TriCore architecture of Siemens. The register file used in the TriCore architecture is partitioned to two halves that are referred to as an upper context and a lower context. The TriCore has a plurality context save areas (CSA) within a memory module. Each CSA can store the upper context or the lower context. The various CSAs are linked to each other. The processor can not start to handle a higher priority task until at least the lower context is transferred to a CSA. This solution is time consuming and results in a relatively high overhead.

Motorola M*Core chip has a very low overhead context switch capability for real time event handling. The M*Core chip has two register files. A general register file and an alternate register file. The alternate register file reduces the overhead associated with context switching and saving/restoring time for critical tasks. When selected, the alternate register file replaces the general register file for all instructions that normally use a general register. Important parameters and pointer values may be retained in the alternate file and thus are readily accessible when a high priority task is entered. The M*Core is very effective when a there are up to two priority levels. Two priority levels indicate that in each given moment there are up to two relevant contexts—a lower priority task context and a higher priority task context. The first can be stored in the general register file while the second can be stored in the alternate register file. Therefore, the context switch does not require any context to be written to a memory module. Thus, the two register files of the M*Core allow very low overhead context switching capability for real time events.

The complexity of CPU and especially the variety of tasks that they handle has grown in the last years. Processors are required to support multilevel nesting of tasks. Prior art methods and devices did not have a high speed low overhead context switch capability for supporting multilevel (>2) nesting of tasks.

There is a need to provide a device and a method for performing fast context switching with very low overhead, in processors that support multilevel nesting of tasks.

BRIEF DESCRIPTION OF THE DRAWINGS

While the invention is pointed out with particularity in the appended claims, other features of the invention are disclosed by the following detailed description taken in conjunction with the accompanying drawings, in which:

DETAILED DESCRIPTION OF THE DRAWINGS

It should be noted that the particular terms and expressions employed and the particular structural and operational details disclosed in the detailed description and accompanying drawings are for illustrative purposes only and are not intended to in any way limit the scope of the invention as described in the appended claims.

The invention provides a device and method for performing high speed low overhead context switch in processors that support multilevel task nesting. A plurality (N1) of register files allow the processor to perform a context switch by switching between the register files, without waiting for a context to be transferred to or from a register file, as long the processor serves up to N1 nested tasks.

The invention provides a device and method for performing high speed low overhead context switch. The processor transfers a first task context from (to) a context save area in a memory module to (from) a register file while handling a second task using another register file.

For convenience of explanation, a request to service a task that has a higher priority that a task that is currently being handled by the processor is referred to as a forward request 81 and a request to return to handle the lower priority task that was previously halted is referred to as backward request 82.

The invention provides a plurality of register files and a direct memory access mechanism that allows a processor to respond to a forward request by starting to handle a higher priority task using a first register file while transferring the halted task context from the second register file to a context save area within a memory module. Furthermore, the processor responds to a backward request by using the context that is stored in a first register file, while transferring to the second register file a lower priority task context.

Usually interrupts and exceptions are given higher priorities. In various processors, such as the PowerPC 601, higher priority are given to some exceptions, such as asynchronous, imprecise exceptions, while other exceptions, such as synchronous precise exceptions, are given lower priority.

When a precise exceptions occurs in a pipelined processor, forward request 81 is issued after the all prior instructions in the instruction stream are executed.

Figure 1:
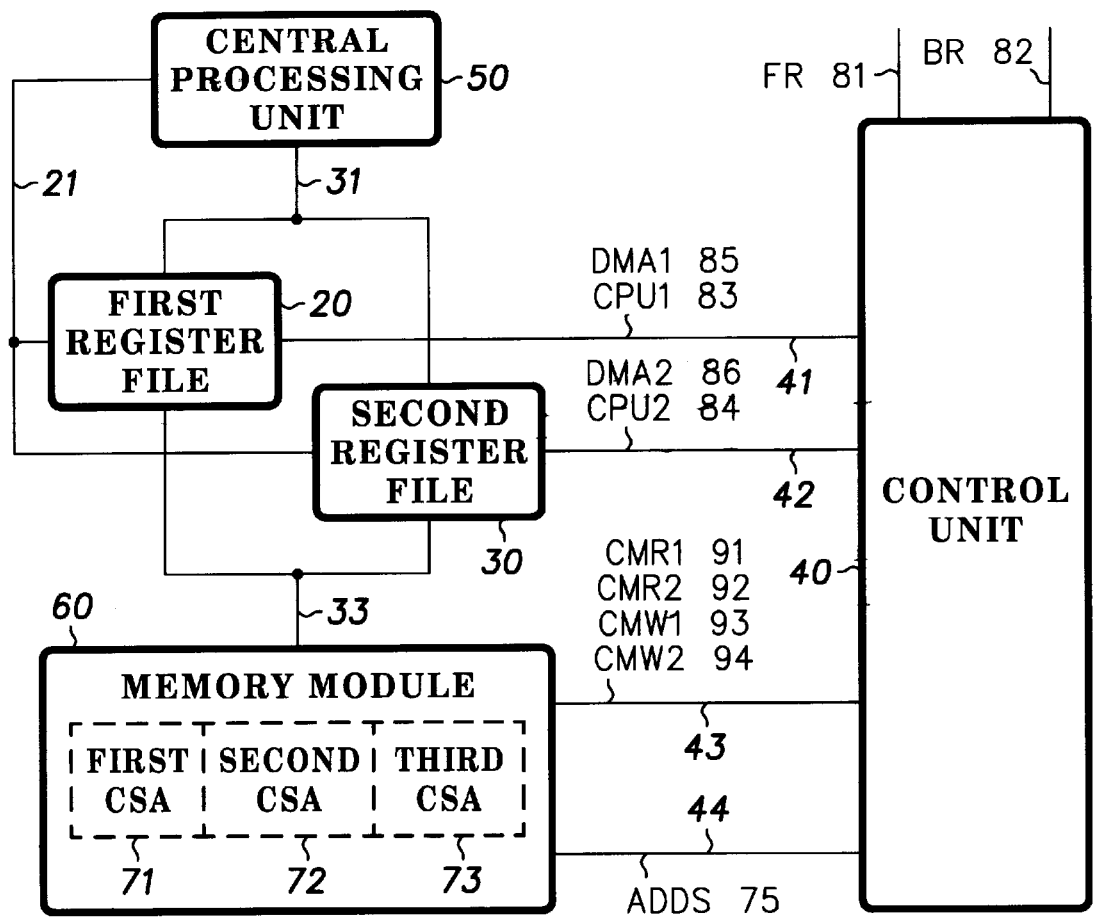
FIG. 1 is a schematic description of a device for performing high-speed low overhead context switch, according to a preferred embodiment of the invention.

FIG. 1 is a schematic description of device for performing high-speed low overhead context switch (i.e. device) 10. Device 10 conveniently forms a part of a processor 12 than has a CPU 50. Device 10 comprising: first and second register files 20 and 30, control unit 40, and memory module 60. CPU 50 is coupled to first and second register files 20 and 30 via data bus 21 and control and address bus 31. Control unit is coupled to first and second register files 20 and 30 via first and second control buses 41 and 42 accordingly, and is further coupled to memory module 60 via third control bus 43 and through memory address bus 44. First and second register files 20 and 30 are coupled via DMA data bus 33 to memory module 60.

Control unit 40 receives forward request 81 and backward requests 82 and determines which register file can be accessed by CPU 50 and which context is to br transferred between another register file and a context save area within memory module 60. Usually, forward request 81 is referred to as interrupt request, while backward request is referred to as back from interrupt. Control unit 40 sends, via first and second control buses 41 and 42 control signals CPU1 83 and CPU2 84 that determine which of first and second register file 20 and 30 can be accessed by CPU 50, in a manner that CPU 60 can access a single register file at each given moment. Control unit 40 sends control signals DMA1 85 and DMA2 86, via first and second control buses 41 and 42 for determining which register file is involved in a context transfer and whether a context is transferred from a register file to a context save area or vice verse.

Memory module 60 has a plurality of context save areas, in which contexts can be saved. Conveniently, there are N−1 context save areas, whereas N is the nesting depth.

Conveniently, control unit 40 has a direct memory access (i.e.—DMA) controller 49 that permits context transfers between register files 20 and 30 and context save area within memory module 60 DMA. Using address and control buses 43 and 44, first and second control buses 41 and 42 DMA controller 49 determines the address of the context save area which takes part in a context transaction and whether the context is sent to a register file to a context save area or vice verse.

Conveniently, in order to speed the writing and storing process first and second DMA data buses 23 and 33 are relatively wide.

Figure 2:
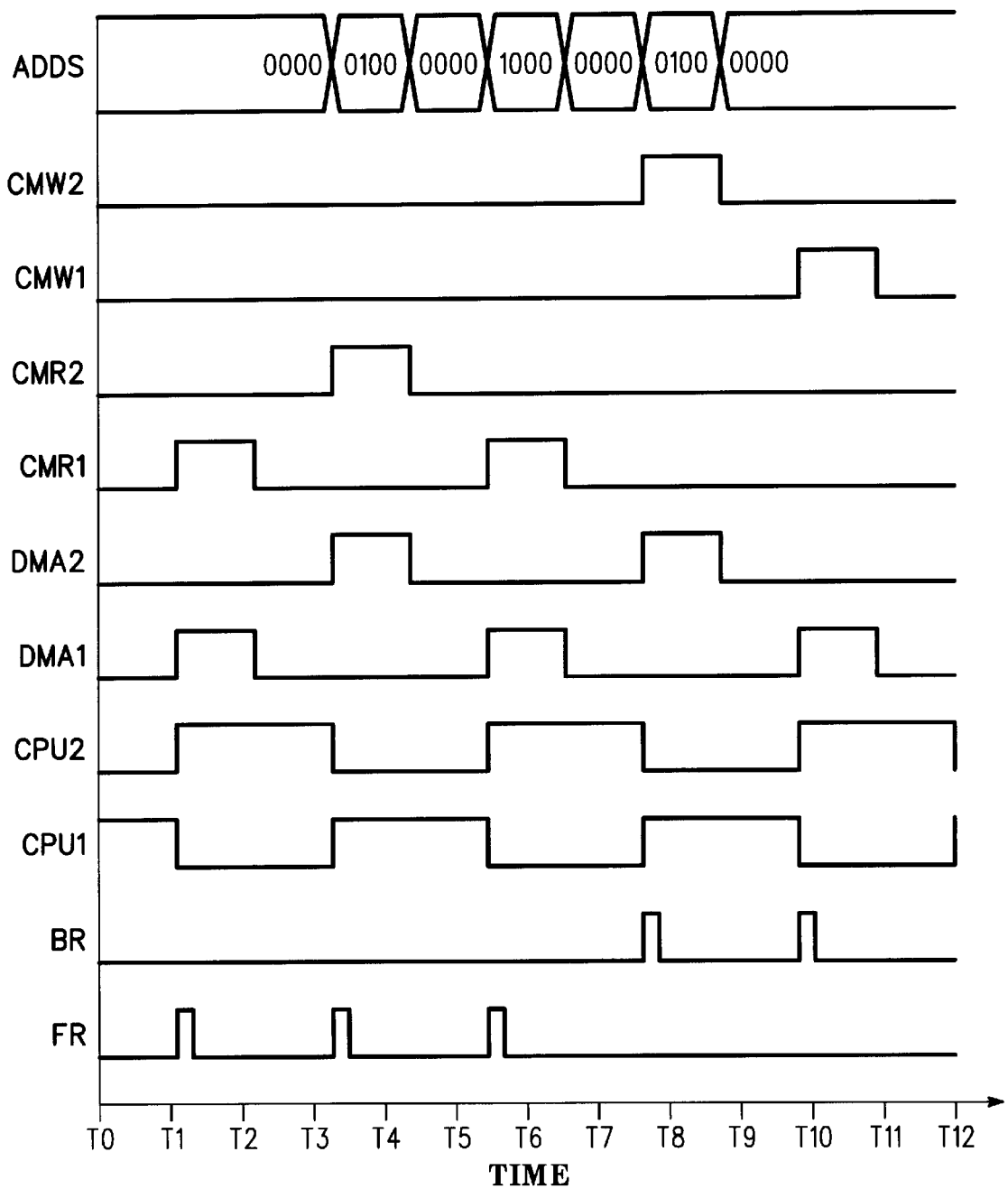
FIG. 2 is a schematic time diagram for various conditions of operation of the present invention.

Referring to FIG. 2, at moment T1 processor handles a P4 priority task. All context save areas of memory module 60 are empty. The address of first, second and third context save areas 71, 72 and 73 are 0000, 0100 and 1000 accordingly. First register file 20 holds the P4 priority task context.

At moment T2 the processor is requested to handle a P3 priority task. Accordingly, forward request 81 goes high, and causes control unit 40 to initiate a context switch. After a short while forward request 81 goes low. Control signal CPU1 83 goes low and control signal CPU2 84 goes high, indicating that CPU 50 accesses second register file 30 instead of first register file 20. Control signals DMA1 85 and CMR1 91 go high and initiate a DMA transfer of the P4 priority task context from first register file 20. The value of the address signal ADDS 75 that is sent via bus 44 to memory module 60 equals 0000. The transfer of the P4 priority task context from first register file 20 to first context save area 71 ends at T3, where ADDS 75, DMA1 85 and CMR1 91 go low.

At moment T4 the processor is requested to handle a P2 priority task. Accordingly, forward request 81 goes high, and causes control unit 40 to initiate a context switch. After a short while forward request 81 goes low. Control signal CPU1 83 goes high and control signal CPU2 84 goes low, indicating that CPU 50 accesses first register file 20 instead of second register file 30. Control signals DMA2 86 and CMR2 92 go high and initiate a DMA transfer of the P3 priority task context from second register file 30. The value of the address signal ADDS 75 that is sent via bus 44 to memory module 60 equals 0100. The transfer of the P3 priority task context from second register file 30 to second context save area 72 ends at T5, where ADDS 75, DMA2 86 and CMR2 92 go low.

At moment T6 the processor is requested to handle a P1 priority task. Accordingly, forward request 81 goes high, and causes control unit 40 to initiate a context switch. After a short while forward request 81 goes low. Control signal CPU1 83 goes low and control signal CPU2 84 goes high, indicating that CPU 50 accesses second register file 30 instead of first register file 20. Control signals DMA1 85 and CMR1 91 go high and initiate a DMA transfer of the P2 priority task context from first register file 20. The value of the address signal ADDS 75 that is sent via bus 44 to memory module 60 equals 1000. The transfer of the P2 priority task context from first register file 20 to third context save area 73 ends at T7, where ADDS 75, DMA1 85 and CMR1 91 go low.

At moment T8 the P1 priority task ends, and accordingly backward request 82 goes high. After a short while backward request 82 goes low. CPU 50 resumes to handle the P2 priority task, whereas the P2 priority task context is stored in first register file 20. Control signal CPU1 83 goes high and control signal CPU2 84 goes low, indicating that CPU 50 accesses first register file 20 instead of second register file 30. Control signals DMA2 86 and CMW2 94 go high and initiate a DMA transfer of the P3 priority task context to second register file 30. The value of the address signal ADDS 75 that is sent via bus 44 to memory module 60 equals 0100. The transfer of the P3 priority task context from the second context save area 72 to second register file 30 ends at T9, where ADDS 75, DMA2 86 and CMW2 94 go low.

At moment T10 the P2 priority task ends, and accordingly backward request 82 goes high. After a short while backward request 82 goes low. CPU 50 resumes to handle the P3 priority task, whereas the P3 priority task context is stored in second register file 30. Control signal CPU1 83 goes low and control signal CPU2 84 goes high, indicating that CPU 50 accesses second register file 30 instead of first register file 20. Control signals DMA1 85 and CMW1 93 go high and initiate a DMA transfer of the P4 priority task context to first register file 20. The value of the address signal ADDS 75 that is sent via bus 44 to memory module 60 equals 0000. The transfer of the P4 priority task context from the first context save area 71 to first register file 20 ends at T11, where ADDS 75, DMA1 85 and CMW1 93 go low.

At moment T12 the P3 priority task ends, and accordingly backward request 82 goes high. After a short while backward request 82 goes low. CPU 50 resumes to handle the P4 priority task, whereas the P4 priority task context is stored in first register file 20. Control signal CPU1 83 goes high and control signal CPU2 84 goes low, indicating that CPU 50 accesses first register file 20 instead of second register file 30.

Conveniently, while a context is transferred between memory module 60 and either first or second register files 20 and 30, the forward and backward request signals 81 and 82 are masked, in order to ensure that the contexts are not corrupted.

The context transfer can be further accelerated by having variable size contexts in a manner that only a portion of a register file is transferred between a register file to a context save area. In order to implement such a scheme control unit 40 has to receive a SIZE signal that indicates the size of the context being transferred, and has to store previous SIZE signals so that it can retrieve that context to the register file. Furthermore, the value of ADDS 75 signal will depend of a previous value of ADDS 75 and a previous value of SIZE signal. The context save areas will have variable size, corresponding to the SIZE signals. DMA controller 41 shall receive the SIZE signal and accordingly transfer only a SIZE length context.

The context switch can be further accelerated by having more than two register files, so that the CPU can switch between more than two tasks without performing a context transfer from memory module 60 to a register file. In order to implement such a scheme control processor has to have additional register files, and control unit 40 shall provide additional control signals to the additional register files and to the memory module. Preferably the additional register files are analogues to first and second register files 20 and 30 and are coupled to CPU 50, control unit 40 and memory module 60 in the same manner. For example, if there is an additional register file 29, control unit will provide it control signals such as CPU3 and DMA3, analogues to CPU1/CPU2 and DMA1/DMA2 accordingly. Additional register file will be coupled to memory module 60 via a third DMA bus and control unit 40 will provide memory module 60 control signals of CMR3 and CMW3, analogues to CMR1/CMR2 and CMW1/CMW2.

Figure 3:
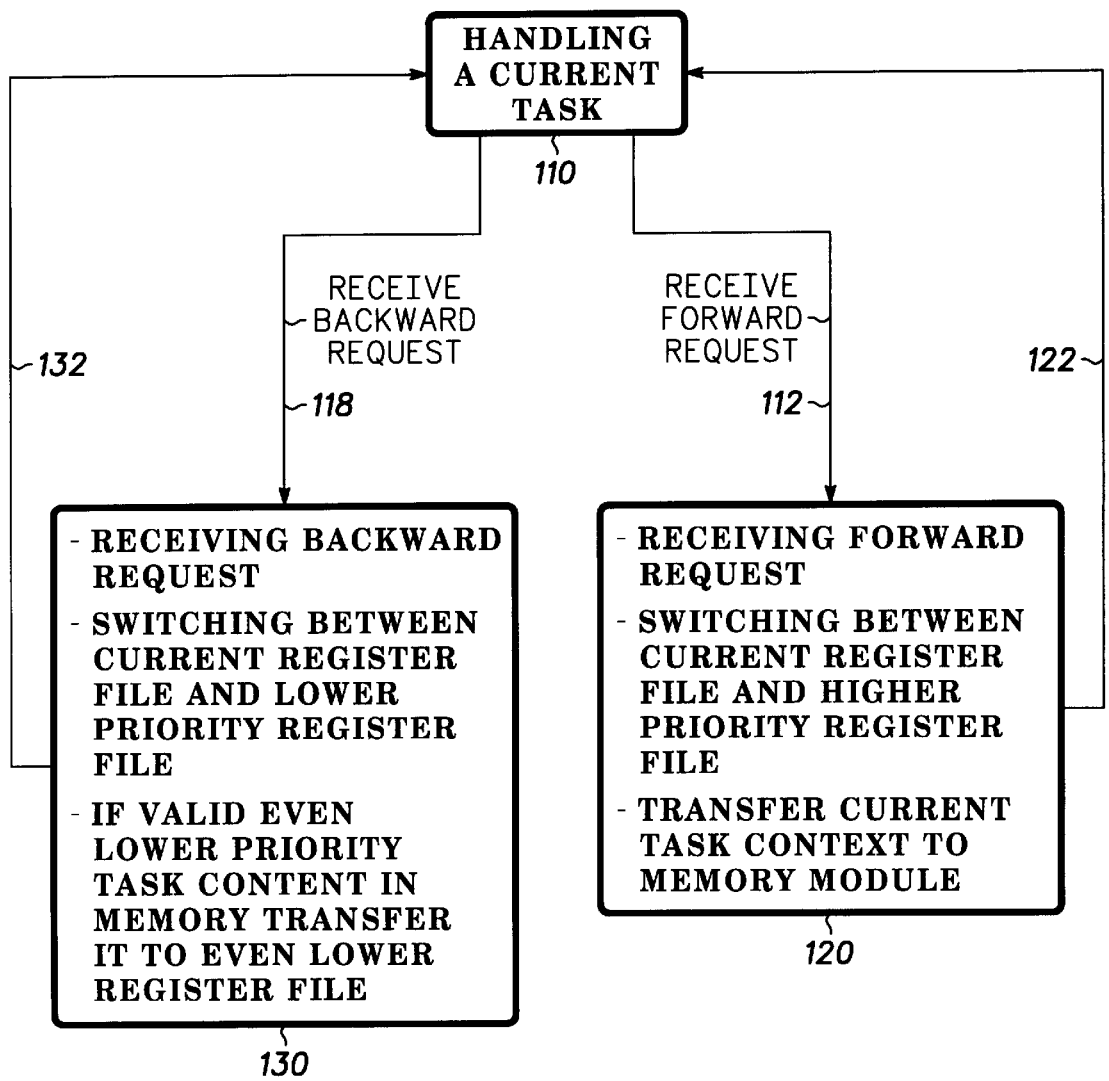
FIG. 3 is a schematic flow diagram of a method for performing high-speed low overhead context switch.

FIG. 3 is a flow chart of method 100 for allowing a processor to perform high-speed low overhead context switch.

A task that is currently handled is referred to as a current task. A context that is associated to the current task is referred to as a current priority task context. A register file that is accessed while the current task is handled is referred to as a current register file. A task that has a higher priority than the priority of the current task is referred to as higher priority task. A context that is associated to the higher priority task is referred to as a higher priority task context. A register file that stores the higher priority task context is referred to as a higher priority register file. A task that has a lower priority than the priority of the current task is referred to as lower priority task. A context that is associated to the lower priority task is referred to as a lower priority task context. A register file that stores the lower priority task context is referred to as a lower priority register file. A task that has an even lower priority than the priority of the lower priority task is referred to as an even lower priority task. A context that is associated to the even lower priority task is referred to as an even lower priority task context. A register file that stores the even lower priority task context is referred to as an even lower priority register file.

Rectangular boxes 110, 120 and 130 represent steps of method 100. Method 100 comprising the steps of:

Handling (step 110) a current task by a CPU of a processor, whereas during the handling process the CPU is allowed to access a current register file. A lower priority task context can be stored in a lower priority register file and in a context save area within a memory module. The lower priority task context is stored in such a manner if CPU 50 has previously halted to handle the lower priority task in order to handle a task that had higher priority than the lower priority task. As indicated by path 112, if a higher priority task needs to be handled, step 110 is followed by step 120. As indicated by path 118, if the current task ends and there is a need to resume handling the lower priority task then step 110 is followed by step 130.

Performing a forward context switch (step 120) if receiving a request to handle a higher priority task. During step 120 the current register file is switched with the higher priority register file and the context of the current task is transferred to a memory module. Conveniently, the CPU is prevented from accessing the current register file until the current task context is transferred to the memory module; Jumping to step 110 whereas the current task becomes a lower priority task and the higher priority task becomes the current task, as indicated by path 122.

Performing a backward context switch (step 130) if receiving a request to resume handling a lower priority task. During step 130 the current register file is switched with the lower priority register file. If the memory module stores a valid even lower priority context, the even lower priority context is transferred to the even lower register file; Jumping to step 110 whereas the lower priority task becomes the current task and if there is a valid even lower priority task it becomes the lower priority task, as indicated by path 132.

For example, it is assumed that there are three levels of priority P1, P2 and P3, whereas P1 is the highest priority and P3 has the lowest priority; there are two register files 20 and 30 and two context save areas 71 and 72 within memory module 60.

During step 110 CPU 50 handles a P2 priority task, whereas CPU 50 is allowed to access first register file 20. The P2 priority task is the current task and first register file 20 is the current register file. Previously, CPU 50 stopped to handle a P3 priority task when a request to handle the P2 priority task arrived. This P3 priority task is the lower priority task. The context of the P3 priority task is the lower priority task context. It is stored second register file 30 (referred to as a lower priority register file) and in a first context save area 71 (referred to as lower priority context save area).

When CPU 50 finishes to handle the P2 priority task, and as indicated by path 118, step 110 is followed by step 130 in which the P3 priority task is handled, and is whereas CPU 50 accesses first register file 20. Thus, first register file 20 becomes the current register file and the P3 priority task becomes the current task.

If, during step 110, CPU 50 is requested to handle a P1 priority task, step 110 is followed by step 120 in which a first type context switch is performed. The P1 priority task is the current task. The P2 priority task becomes a lower priority task and the P3 priority task becomes the more lower priority task. During step 120 the P2 priority task context (i.e.—the lower priority task context) is transferred to a context save area within the memory module. As indicated by path 122 step 120 is followed by step 110 in which the P1 priority task is handled.

It should be noted that the particular terms and expressions employed and the particular structural and operational details disclosed in the detailed description and accompanying drawings are for illustrative purposes only and are not intended to in any way limit the scope of the invention as described in the appended claims.

Thus, there has been described herein an embodiment including at least one preferred embodiment of an improved method and apparatus for a device and a method for performing high-speed low overhead context switch. It will be apparent to those skilled in the art that the disclosed subject matter may be modified in numerous ways and may assume many embodiments other than the preferred form specifically set out and described above.

Accordingly, the above disclosed subject matter is to be considered illustrative and not restrictive, and to the maximum extent allowed by law, it is intended by the appended claims to cover all such modifications and other embodiments which fall within the true spirit and scope of the present invention. The scope of the invention is to be determined by the broadest permissible interpretation of the following claims and their equivalents rather than the foregoing detailed description.

We claim:

1. A device for performing a context switch in a processor, the processor having a central processing unit and being adapted to handle tasks of various priority, the device comprising:

register files, coupled to the central processing unit;

a memory module, coupled to the register files, adapted to store task contexts;

a control unit, coupled to the central processing unit, to the register files and to the memory module;

wherein the control unit is adapted to receive a forward request for handling a task that has higher priority than a current task that is handled by the processor, to switch between a current register file that stores the current task context to another register file in a manner that the central processing unit is able to access the other register file, and to transfer a current task context from the current register file to the memory module and wherein the control unit is adapted to receive a backward request for resuming the handling of a previous task, the handling of the previous task previously being halted as a result of a request to handle a higher priority task, to switch between a register file that stored a higher priority task context, to a previous register file that stores a previous task context in a manner that the central processing unit is able to access the previous register file, and if the memory module stores a context of a task that has lower priority than the previous task to transfer a lower priority task context to another register file.

2. The device of claim 1 wherein during a transfer of a context between a register file and the memory module, backward requests and forward requests are masked.

3. The device of claim 1 wherein the memory module has a plurality of context save areas, each context save area is adapted to store a single context.

4. The device of claim 1 wherein the control unit has a direct memory access controller, for controlling the transfer of contexts between the memory module and the register files.

5. The device of claim 1 wherein the register files and coupled to the memory module via a wide data bus.

6. The device of claim 1 wherein interrupts and exceptions are given high priority.

7. The device of claim 1 wherein the device is adapted to handle variable size contexts, wherein the device is adapted to receive a forward request and SIZE information defining the current task context size, to transfer the current task context from the current register file to a memory module, to save the SIZE information; and wherein the device is adapted to receive a backward request and to use the stored SIZE information in order to transfer the previous task context from the memory module to the previous register file.

8. The device of claim 1 wherein the processor is adapted to handle up to N1 nested tasks and the memory module has N1-1 context save areas.

9. The device of claim 8 wherein a forward request is driven from an interrupt request signal and the backward request is driven from a back from interrupt signal.

10. A processor having a high speed low overhead context switch capability, the processor is adapted to handle tasks of various priority, the processor comprising:

a central processing unit;

register files, coupled to the central processing unit;

a memory module, coupled to the register files, adapted to store task contexts;

a control unit, coupled to the central processing unit, to the register files and to the memory module;

wherein the control unit is adapted to receive a forward request for handling a task that has higher priority than a current task that is handled by the processor, to switch between a current register file that stores the current task context to another register file in a manner that the central processing unit is able to access the other register file, and to transfer a current task context from the current register file to the memory module; and wherein the control unit is adapted to receive a backward request for resuming the handling of a previous task, the handling of the previous task previously being halted as a result of a request to handle a higher priority task, to switch between a register file that stored a higher priority task context, to a previous register file that stores a previous task context in a manner that the central processing unit is able to access the previous register file, and if the memory module stores a context of a task that has lower priority than the previous task to transfer a lower priority task context to another register file.

11. The processor of claim 10 wherein during a transfer of a context between a register file and the memory module, the processor does nor respond to a new backward or forward requests.

12. The processor of claim 10 wherein the memory module has a plurality of context save areas, each context save area is adapted to store a single context.

13. The processor of claim 10 wherein the control unit has a direct memory access controller, for controlling the transfer or contexts between the memory module and the register files.

14. A method for performing high speed low overhead context switch in a processor, the method comprising the steps of:

handling a current task; wherein a CPU of the processor is allowed to access a current register file;

receiving a request for handling a higher priority task, and accordingly switching between the current register file to a higher priority register file and transferring a current task context from the current register file to a memory module; jumping to the step of handling a current task wherein the higher priority task becomes the current task and the higher priority register file becomes the current register file; and receiving a request for resuming to handle a lower priority task, and accordingly switching between the current register file to a lower priority register file; if an even lower priority task context is stored in the memory module the even lower priority task context is transferred to the current register file; jumping to the step of handling a current task wherein the lower priority task becomes the current task and if there is an even lower priority task it becomes the lower priority task.

15. The method of claim 14 wherein the switching between the current register file to a higher priority register file and the transferring of the current task context from the current register file to the memory module occur simultaneously.

16. The method of claim 14 wherein requests for handling a higher priority task are masked during the transfer of the current task context to the memory module.

17. The method of claim 14 wherein contexts are stored in context save areas within the memory module, wherein each context save area is adapted to store a single context.

18. The method of claim 14 wherein the contexts have variable size, wherein during the step of receiving a request for handling a higher priority task further receiving a SIZE information defining the current task context size and storing the SIZE information; and wherein during the step of receiving a request for resuming to handle a lower priority task, using the SIZE information that was previously stored to transfer the current task context from the memory module.

* * * * *